United States Patent

Hrubesh et al.

[15] 3,691,454
[45] Sept. 12, 1972

[54] MICROWAVE CAVITY GAS ANALYZER

[72] Inventors: Lawrence W. Hrubesh, 934 El Rancho Drive; Roger E. Anderson, 4354 Guilford Avenue, both of Livermore, Calif. 94550

[73] Assignee: said Hrubesh, by said Anderson

[22] Filed: Oct. 19, 1970

[21] Appl. No.: 81,798

[52] U.S. Cl. ..........................324/0.5 R, 324/58.5 C
[51] Int. Cl. ..............................................G01n 27/78
[58] Field of Search........324/0.5 A, 0.5 AC, 0.5 AH, 324/58 C, 58.5 C

[56] References Cited

UNITED STATES PATENTS

| 3,456,185 | 7/1969 | Akao | 324/58.5 C |
| 3,582,778 | 6/1971 | Faulkner | 324/0.5 A |
| 3,562,631 | 2/1971 | Lee | 324/0.5 AH |

OTHER PUBLICATIONS

F. W. Chapman, R.E. Michel — Solid State Source for Microwave Spectroscopy — Rev. of Sci. Instr. — 38(8) — Aug. 1967 — pp. 1170, 1171.

A. Carrington, D. H. Levy, T. A. Miller — Stark Modulated Gas Phase Electron Resonance Cavity — Rev. of Sci. Instr. — 38(8) — Aug. 1967, pp. 1183, 1184.

Primary Examiner—Michael J. Lynch
Attorney—C. Michael Zimmerman

[57] ABSTRACT

A gas analyzer is described which uses a solid state source of microwave energy to excite a cavity resonator of the Fabry-Perot type which is adapted to accomodate a sample of a gas to be analyzed. A detector and recorder arrangement is provided for detecting the frequencies of the microwave energy within the cavity at the time a portion of the energy is absorbed by the gas sample. Since such frequencies of absorption are different for different gases, such absorption provides a means of detecting the presence of particular gases within the sample as well as determine other characteristics thereof. One plate of the Fabry-Perot cavity resonator is moveable toward and away from the other to simultaneously vary the resonant frequency of the cavity and the output frequency of the solid state source.

9 Claims, 3 Drawing Figures

PATENTED SEP 12 1972 3,691,454
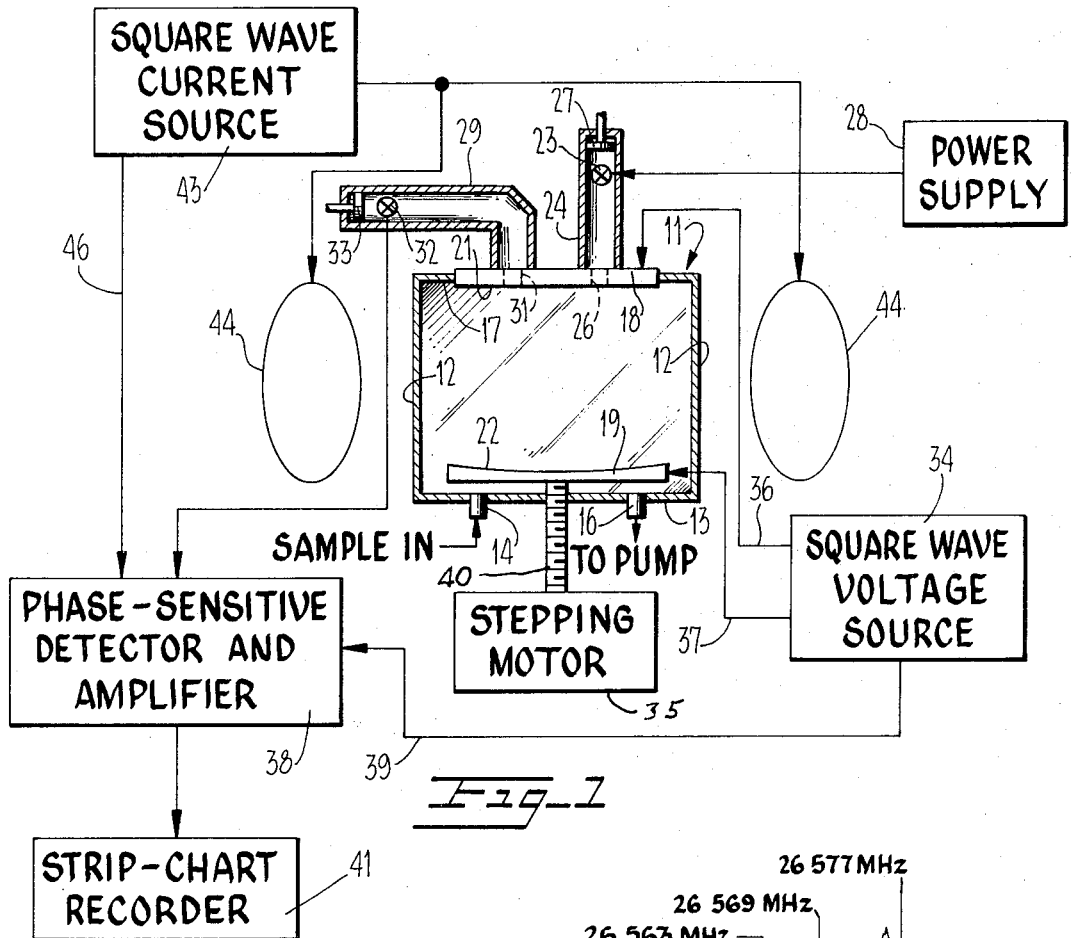
Fig_1
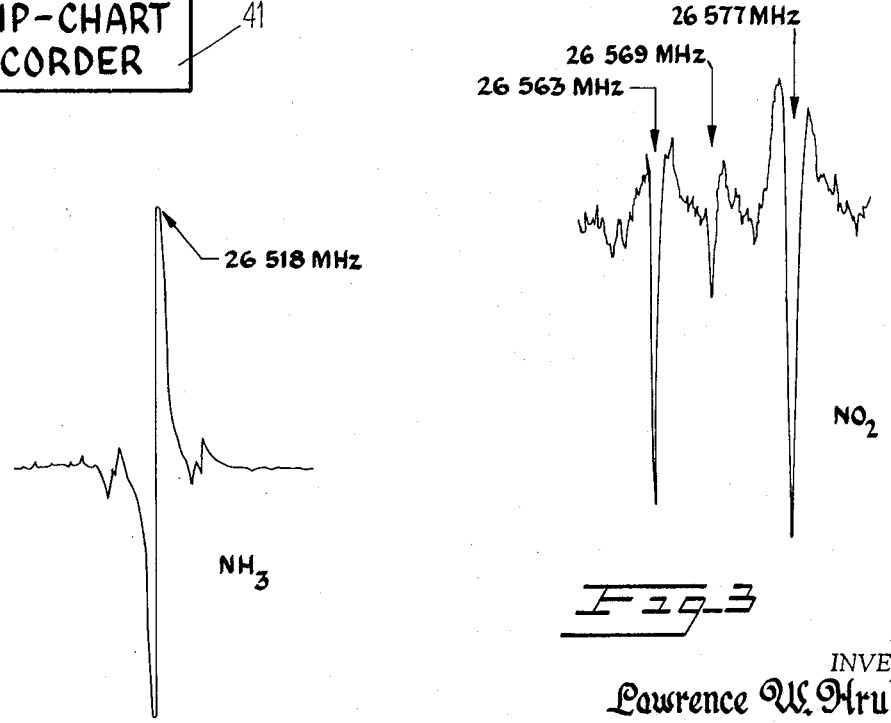
Fig_2 — NH₃ — 26 518 MHz
Fig_3 — NO₂ — 26 563 MHz, 26 569 MHz, 26 577 MHz
INVENTOR.
Lawrence W. Hrubesh
BY Roger E. Anderson
ATTORNEY

MICROWAVE CAVITY GAS ANALYZER

BACKGROUND OF THE INVENTION

This invention relates to a gas analyzer and, more particularly to such an analyzer which is quite sensitive and yet which is simple and can be made inexpensively.

It is becoming increasingly necessary for many purposes to determine the properties of the gaseous substances within a chosen environment and to determine whether or not specific gases are present in an environment. Not only is the make-up and state of gaseous substances of interest in areas of scientific research, but the increasing pollution of our atmosphere makes the identification and measurement of the gaseous substances in air quite important. Many different types of gas analyzers designed to identify the nature and state of gases have been provided in the past. One type which has become widely of interest due to its inherent accuracy and the wide range of information obtainable is that which is based on the physical phenomenon that gas molecules undergo a change in energy state when they are subjected to an energy field of an appropriate frequency. The frequency of the applied energy at which it causes the change in molecular state is dependent upon the type of gas molecule involved, as well as other characteristics thereof. Thus, if one knows the frequencies at which energy is absorbed or otherwise affected by a gas molecule, he can identify it and obtain other useful information about it.

While the advantages of analyzers based on molecular interaction with an energy field are well recognized, they have not been adopted to any great extent in the past for various reasons. For one thing, the energy frequencies to which most gases must be subjected to have molecular absorption or dispersion lie in the microwave frequency range, and the use of conventioanl sources of microwave energy, such as klystrons, magnetrons and backward wave oscillators, makes gas analyzers of this type quite bulky. Moreover, the circuitry which has been required to detect absorptions by the gas molecules is quite complicated and expensive.

SUMMARY OF THE INVENTION

The present invention is a gas analyzer of the type relying on the affect of microwave energy on gas molecules, and which is highly sensitive but yet can be made quite compact and does not require complicated circuitry. In its basic aspects, the gas analyzer includes a microwave cavity resonator which is excited by a solid state source of microwave energy, such as a Gunn effect diode. The provision of the solid state source of energy as a part of the combination is particularly significant since such a source requires only a simple biasing means such as a battery rather than the complex power supplies and control circuitry associated with more conventional sources of microwave energy. Means are provided for varying the frequency of resonance of the cavity, such as by changing its dimensions, and correspondingly causing the frequency of oscillation of the solid state source to be varied for rotational spectroscopy. Means are also provided for introducing a gas to be analyzed into the cavity where it will be subjected to the microwave energy, and a detection means is included for detecting the affect of the gases in the chamber on the energy at a frequency or frequencies characteristic of properties of the gas.

Most desirably, the means for varying the frequency of resonance of the cavity, and correspondingly varying the frequency of oscillation of the solid state microwave energy source, is designed to continuously sweep such frequencies of resonance and oscillations through a range of frequencies which include those frequencies at which various gaseous elements will interact with a portion of the microwave energy. The sweeping of the field in the cavity through the range will enable the identification of the gases making up an unknown sample. Also, the cavity is preferably one having a high Q, i.e., above 1,000 and most desirably greater than 10,000. An analyzer having a high Q cavity is especially sensitive in view of the low energy losses of such a cavity. A Fabry-Perot type of resonant cavity is especially desirable from this standpoint in light of its high volume to surface area.

The solid state source of microwave energy is most suitably provided in a low Q microwave structure which is tightly coupled to the resonant cavity. The low Q microwave structure not only aids in the initial excitation of the source, but when it is combined with a high Q resonant cavity for the analysis, the source structure and the cavity cooperate in a manner such that when the frequency of resonance of the high Q cavity is changed, it causes a corresponding and stable change in the frequency of oscillation of the source, thereby eliminating the necessity of providing complex electronics to assure synchronization of the two frequencies.

It will be appreciated that a gas analyzer having the combination of the various elements described above will have the inherent accuracy and sensitivity of an analyzer based on the molecular interaction with energy principle, but without requiring the complexity and bulkiness of prior analyzers of this nature. Other features and advantages of the instant invention will be described and will become apparent from the following more detailed description.

BRIEF DESCRIPTION OF THE DRAWING

FIG. 1 is a diagramatic illustration of a preferred embodiment of the present invention;

FIG. 2 is a tracing representing the detection by the analyzer of $NH_3$; and

FIG. 3 is another tracing representative of the detection by the analyzer of $NO_2$ with an alternate detection system.

DESCRIPTION OF THE PREFERRED EMBODIMENT

Reference is first made to FIG. 1 of the accompanying drawing which diagrammatically illustrates a preferred embodiment of the gas analyzer of the invention. The gas analyzer includes a housing, generally referred to by the reference numeral 11, which acts simultaneously as an enclosure for a sample of the gases to be analyzed and as a part of the microwave cavity resonator. More particularly, housing 11 is a cylindrical structure whose side and bottom walls, 12 and 13 respectively, are made of an electrically nonconductive material such as glass. Means are provided for introducing into the enclosure a sample of a gas to be analyzed. That is, an inlet 14 to which a source of the gas can be connected communicates with the interior of the enclosure through its bottom wall 13. An outlet 16 is also provided on bottom wall 13 to facilitate evacuation of the enclosure 12 before the introduction therein of a sample, as well as to facilitate later removal of the sample, such as by means of high vacuum pumping.

The upper wall 17 of the enclosure 11 includes a portion which is part of the microwave cavity resonator structure for subjecting the gas sample to a microwave energy field. That is, the upper wall 17 is partially defined by a conductive plate 18 which cooperates with an opposing conductive plate 19 located within the chamber to provide a pair of opposed and spaced apart, energy reflective, surfaces 21 and 22, respectively, between which appropriately introduced microwave energy is reflected in a standing wave resonant condition. In other words, such plates 18 and 19 and the reflective surfaces 21 and 22 thereof define a Fabry-Perot type cavity resonator. As has been mentioned previously, this type of resonator is best suited for the purposes of the invention in view of its high volume to surface ratio and, hence, its high Q and consequent low energy losses. The cavity is most desirably of the semiconfocal type for compactness and less critical requirements in construction. That is, while the reflective surface 21 on plate 18 is flat, the other reflective surface 22 is concavely curved with a radius of curvature equal to twice the separation between the plates.

Means are provided for exciting the cavity with microwave energy. As a particularly salient feature of the instant invention, such means is in the form of a solid state microwave source, schematically depicted at 23 in FIG. 1. While it is most preferable that the source 23 be a Gunn effect diode because of such diode's low residual FM noise, it will be appreciated that some other solid state source, such as an avalanche diode, could also be used.

Diode 23 is rigidly mounted within a microwave structure defined by a section of waveguide 24. For reasons which will become more apparent hereinafter, most desirably, waveguide 24 is a resonant structure having a low Q, i.e., below 1,000. Waveguide 24 is coupled by means of a coupling iris 26 extending through plate 18 with the microwave cavity resonator so that energy from the diode 23 can excite the cavity. To enable tuning of the diode 23 to a condition of oscillation, the free end wall 27 of waveguide 24 is in the form of a movable piston 27 as is conventional.

Means are provided for biasing diode 23 to cause oscillation thereof. For this purpose, a simple external power supply 28 can be provided. Such power supply can be in the form of a battery or inexpensive electronic supply. The straight forwardness of this biasing means is an important asset of the use of a solid state microwave energy source, and is to be contrasted with the complicated power supplies and control circuits associated with more conventional microwave sources such as klystrons, magnetrons and backward wave oscillators. Means are also provided for extracting from the resonator cavity a measurement of the microwave energy therein so that it can be determined whether or not any portion of it has been absorbed by the gas sample within the cavity. To this end, a second microwave waveguide section 29 is coupled to the resonator cavity by means of a coupling iris 31 extending through plate 18. A conventional crystal detector 32 is rigidly mounted within waveguide 29 to receive energy coupled into the waveguide from the cavity. The end wall 33 of waveguide 29 is in the form of a moveable piston to facilitate optimizing the amount of energy reaching detector 32.

As mentioned previously, in many uses of the apparatus, it is desirable to be able to continuously sweep the frequency of the microwave energy in the chamber through a range of frequencies which include those frequencies at which various gaseous elements will interact with the microwave energy. This frequency sweeping is easily accomplished by varying the distance between the opposing plates 18 and 19 and, hence, between the reflective surfaces 21 and 22. For this purpose, a stepping motor 35 is suitably connected to plate 19 via a screw arrangement 40 to move plate 19 toward and away from plate 18 while maintaining their respective orientations relative to one another.

Various methods and means can be used to detect either the absorption or the dispersion of microwave energy by gas within the chamber. For example, modulation techniques applied either directly to the solid state source of microwave energy or to the sample within the cavity can be used. In the embodiment being described, means are provided for causing amplitude modulation of the microwave energy within the cavity via molecular interaction with a low frequency, externally applied field. A square wave voltage source 34 is connected between cavity plates 18 and 19 by leads 36 and 37, respectively, to superimpose on the microwave energy within the cavity a square wave signal. A signal from square wave voltage source 34 is fed into a phase-sensitive detector and amplifier 38 via lead 39 for interaction with the signal received from the cavity resonator and detected by crystal 32 to facilitate the generation by the phase-sensitive detector in accordance with conventional practice of an output signal representative of the absorption or dispersion of microwave energy by the gas within the chamber. This type of modulation technique is referred to in the art as Stark modulation. The signal from the phase sensitive detector can be fed to any suitable read out mechanism, such as the strip chart recorder 41.

FIG. 2 is a sample tracing of an energy absorption in the microwave cavity indicative of the presence of $NH_3$ gas. As is illustrated, when the microwave frequency of the cavity is swept through a range of frequencies including 26, 518 MHz, a sharp discontinuity is registered on the strip chart recorder indicating the absorption of microwave energy at such frequency and thereby providing the desired indication that $NH_3$ is within the chamber.

Stark amplitude modulation as described above is useful for detecting the absorption or dispersion of microwave energy by any molecule having a dipole moment. For the detection of absorption or dispersion by paramagnetic molecules, however, Zeeman modulation is used. To this end, a square wave current source 43 is provided for applying a square wave current to Helmholtz coils schematically indicated at 44 to amplitude modulate the microwave energy in the cavity by means of the interaction of an external magnetic field with the molecules of the gas sample. The absorption of microwave energy by gas within the cavity is manifested by the generation of an appropriate output signal by the phase sensitive detector dependent on the signals it receives from detector 32 and via lead 46 from the square wave current source 43. The resulting detection is again recorded by any suitable means such as strip-chart recorder 41. FIG. 3 illustrates a tracing showing Zeeman modulated lines representative of the presence in the cavity of $NO_2$.

As mentioned previously, modulation of the microwave energy in the cavity as described or direct modulation of the bias applied to the source can be used. To amplitude modulate the source directly, a resonant circuit can be connected into the power supply feed line to the solid state source. Frequency modulation of the source can also be obtained by suitable circuitry within the skill of the art.

While the invention has been described in connection with a preferred embodiment thereof, it will be recognized by those skilled in the art that many changes and modifications are possible within the spirit and scope thereof.

What is claimed is:

1. A gas analyzer of the microwave rotational spectroscopy type comprising a microwave cavity resonator of the Fabry-Perot type having a pair of opposed and spaced-apart, energy-reflective surfaces between which said microwave energy is reflected in a standing wave, resonant condition, the frequency of resonance of said cavity being variable over a range of frequencies which includes certain frequencies at which various gaseous elements will absorb a portion of microwave energy, a sold state source of microwave energy directly coupled with said cavity for exciting the same with microwave energy over said frequency range, means for introducing a gas to be analyzed into said cavity, means for varying the frequency of resonance of said cavity over said range to thereby cause a corresponding variation in the frequency of oscillation of said solid state source because of the microwave coupling of said source with said cavity, and means for detecting the affect of the gas within said cavity on microwave energy at a frequency or frequencies representative of properties of said gas.

2. The gas analyzer of claim 1 wherein said means for varying the frequency of resonance of said cavity and correspondingly varying the frequency of oscillation of said solid state source includes means for continuously sweeping said frequencies of resonance and oscillation through said range of frequencies.

3. The gas analyzer of claim 2 wherein said sold state source of microwave energy is disposed within a low Q microwave structure and said cavity resonator has a high Q, said low Q structure being directly coupled to said cavity resonator to cause said frequency adjustment of the oscillation of said solid state source by reason of the frequency of resonance of said cavity being varied.

4. The gas analyzer of claim 1 wherein said means for varying the frequency of resonance of said cavity includes means for varying the distance between the cooperable reflective surfaces of said plates.

5. The gas analyzer of claim 1 wherein said resonator is of the semi-confocal type with the reflective surface of one of said plates being generally concave.

6. The gas analyzer of claim 1 wherein said means for detecting the affect of the gas within said chamber on said microwave energy detects the absorption of microwave energy by molecules of the gas and includes means for modulating the microwave energy in said resonator and thereafter phase detecting the modulated microwave energy to obtain an output signal representative of said absorption of microwave energy.

7. The gas analyzer of claim 6 wherein said means for modulating said microwave energy modulates the amplitude thereof by the interaction of an externally applied magnetic field with the molecules of said gas within said chamber.

8. The gas analyzer of claim 6 wherein said means for modulating said microwave energy modulates the amplitude thereof by the interaction of an externally applied electrical field with the molecules of said gas within said chamber.

9. The gas analyzer of claim 1 wherein said means for detecting the affect of the gas within said chamber on said microwave energy includes means for modulating the bias applied to said solid state source and thereafter phase detecting the modulated microwave energy in said resonator to obtain an output signal representative of said affect on the microwave energy caused by the gas within said chamber.

* * * * *